United States Patent
Namiki et al.

(10) Patent No.: US 10,647,819 B2
(45) Date of Patent: May 12, 2020

(54) PHOTOCURABLE COMPOSITION AND OPTICAL MATERIAL

(71) Applicant: MITSUBISHI GAS CHEMICAL COMPANY, INC., Tokyo (JP)

(72) Inventors: Kousuke Namiki, Tokyo (JP); Yousuke Imagawa, Tokyo (JP); Eiji Koshiishi, Tokyo (JP); Kikuo Furukawa, Tokyo (JP); Hiroshi Horikoshi, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 15/781,535

(22) PCT Filed: Oct. 7, 2016

(86) PCT No.: PCT/JP2016/079911
§ 371 (c)(1),
(2) Date: Jun. 5, 2018

(87) PCT Pub. No.: WO2017/098798
PCT Pub. Date: Jun. 15, 2017

(65) Prior Publication Data
US 2018/0265638 A1    Sep. 20, 2018

(30) Foreign Application Priority Data

Dec. 10, 2015  (JP) .................. 2015-240986

(51) Int. Cl.
| | | |
|---|---|---|
| C08G 75/08 | (2006.01) |
| G02B 1/04 | (2006.01) |
| C08G 75/06 | (2006.01) |
| C08J 3/28 | (2006.01) |

(52) U.S. Cl.
CPC ............ *C08G 75/08* (2013.01); *C08G 75/06* (2013.01); *C08J 3/28* (2013.01); *G02B 1/04* (2013.01); *C08J 2381/02* (2013.01)

(58) Field of Classification Search
CPC ............ C08G 75/08; G02B 1/04; C08L 81/00
USPC ....................................... 528/375
See application file for complete search history.

(56) References Cited

U.S. PATENT DOCUMENTS

| | | | |
|---|---|---|---|
| 5,807,975 A | 9/1998 | Amagai et al. | |
| 5,945,504 A * | 8/1999 | Amagi | C07D 331/02 528/373 |
| 6,531,532 B1 | 3/2003 | Yoshimura et al. | |
| 6,995,276 B1 | 2/2006 | Okubo et al. | |
| 2004/0024165 A1 | 2/2004 | Yoshimura et al. | |
| 2009/0018308 A1* | 1/2009 | Kamura | C08G 75/08 528/375 |
| 2011/0233048 A1* | 9/2011 | Kuramoto | C07C 271/12 204/157.82 |
| 2016/0152774 A1 | 6/2016 | Namiki et al. | |

FOREIGN PATENT DOCUMENTS

| | | |
|---|---|---|
| JP | 9-71580 | 3/1997 |
| JP | 9-110979 | 4/1997 |
| JP | 9-255781 | 9/1997 |
| JP | 2002-40201 | 2/2002 |
| JP | 2002-90502 | 3/2002 |
| JP | 2003-238562 | 8/2003 |
| JP | 2004-256566 | 9/2004 |
| JP | 3738817 | 11/2005 |
| JP | 2011-38050 | 2/2011 |
| JP | 2014/208656 | 12/2014 |

OTHER PUBLICATIONS

International Search Report in International Patent Application No. PCT/JP2016/079911, dated Dec. 20, 2016.
International Preliminary Report on Patentability in International Patent Application No. PCT/JP2016/079911, dated Jun. 12, 2018.

* cited by examiner

*Primary Examiner* — Shane Fang
(74) *Attorney, Agent, or Firm* — Greenblum & Bernstein, P.L.C.

(57) ABSTRACT

According to the present invention, it is possible to provide a photocurable composition which comprises a cyclic compound (a) represented by formula (1), an episulfide compound (b), and a photopolymerization initiator (c). In a preferred embodiment, the proportion of the cyclic compound (a) in the photocurable composition is 5-80 mass %, the proportion of the episulfide compound (b) is 20-95 mass %, and the proportion of the photopolymerization initiator (c) is 0.1-10 parts by mass per 100 parts by mass of the sum of the cyclic compound (a) and the episulfide compound (b). In the formula, C represents a carbon atom, X represents S, Se, or Te, and a to f are integers of 0-3, provided that $8 \geq (a+c+e) \geq 1$, $8 \geq (b+d+f) \geq 2$, and $(b+d+f) \geq (a+c+e)$.

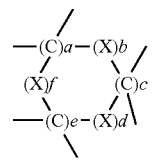

(1)

11 Claims, No Drawings

PHOTOCURABLE COMPOSITION AND OPTICAL MATERIAL

TECHNICAL FIELD

The present invention relates to a photocurable composition containing a photopolymerization initiator useful for producing an optical material for an adhesive for an optical element, a coating agent for optical elements, a resist material, a prism, optical fiber, an information storage board, a filter, a plastic lens, a light guide plate or the like.

BACKGROUND ART

Since plastic materials are light in weight, excellent in toughness, and can easily be dyed, they are recently frequently applied to various optical materials. Properties that are particularly required for many optical materials include a high refractive index. As optical materials having a high refractive index, a number of episulfide compounds that can give optical materials with a refractive index of 1.7 or higher have been found (see Patent Documents 1, 2 and 3). As other technique for increasing a refractive index of a plastic material, a method in which inorganic particles are dispersed into an organic resin is well known. According to this method, however, haze is caused since light scattering caused by the particles cannot be avoided completely. Thus, use of an episulfide compound is more preferable in terms of light transmittance.

Since the method for curing a composition using an episulfide compound is mostly heat curing, there is large restriction on the usage thereof. Furthermore, a photocurable composition is also strongly desired for improving productivity. For example, in order to impart an optical function to a transparent substrate having a refractive index exceeding 1.73 such as lanthanum glass or sapphire glass, a photocurable composition that has a refractive index exceeding 1.73 and that can be provided with a fine structure is desired.

Patent Document 4 reports a cured resin product with a high refractive index that is obtained by photocuring an episulfide composition containing a photobase generator.

As a method for obtaining a cured resin product with a higher refractive index, a technique of copolymerizing a cyclic sulfur compound and an episulfide compound is known. Patent Document 5 reports that a sulfur-containing episulfide compound can be cured with heat and Patent Document 6 reports that an episulfide compound containing a cyclic skeleton structure compound having sulfur can be cured, to obtain a transparent resin having a refractive index exceeding 1.73, respectively. It is, however, generally difficult to use a cyclic sulfur compound for a photocurable composition with a high refractive index. Specifically, a typical cyclic sulfur compound S8 quenches optically active species due to the strong radical-inhibiting activity attributed to its polysulfide structure, while a cyclic sulfide compound that contains more carbon atoms than sulfur atoms is poorly effective in enhancing the refractive index.

Moreover, Patent Document 6 shows only an example of thermal polymerization and not photocuring, and thus it has no intension of using a photopolymerization initiator. Therefore, the property of inhibiting photoactive species is not considered at all.

PRIOR ART DOCUMENTS

Patent Documents

Patent document 1: Japanese Unexamined Patent Application Publication No. H09-71580
Patent Document 2: Japanese Unexamined Patent Application Publication No. H09-110979
Patent Document 3: Japanese Unexamined Patent Application Publication No. H09-255781
Patent Document 4: Japanese Unexamined Patent Application Publication No. 2011-38050
Patent Document 5: Japanese Patent No. 3738817
Patent Document 6: Japanese Unexamined Patent Application Publication No. 2002-040201

SUMMARY OF INVENTION

Problem to be Solved by Invention

The objective to be solved by the present invention is to provide a photocurable composition having a higher refractive index, and an optical material made therefrom.

Means for Solving Problem

The present inventors have gone through keen studies to solve the above-described problem, and as a result of which found that a cyclic compound (a) represented by Formula (1) below is less likely to inhibit optical activity while still retaining contribution to the enhancement of the refractive index, even though it has a structure of cyclic sulfur or the like. Additionally, they found that a photocurable composition containing a cyclic compound (a), an episulfide compound (b) and a photopolymerization initiator (c) shows good photocurability, and that the photocured product thereof has a high refractive index. Furthermore, they found that addition of a thiol compound (d) and/or an acidic compound (e) can enhance stability of the photocurable composition in a dark place.

Thus, the present invention is as follows.

[1] A photocurable composition comprising a cyclic compound (a) represented by Formula (1), an episulfide compound (b) and a photopolymerization initiator (c):

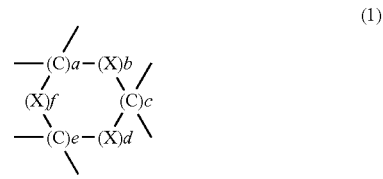

wherein, C represents a carbon atom, X represents S, Se or Te, a to f each represent an integer of 0-3 provided that 8≥(a+c+e)≥1, 8≥(b+d+f)≥2, and (b+d+f)≥(a+c+e).

[2] The photocurable composition according to [1], wherein the proportion of the cyclic compound (a) in the photocurable composition is 5-80 mass %, the proportion of the episulfide compound (b) is 20-95 mass %, the proportion of the photopolymerization initiator (c) is in a range of 0.1-10 parts by mass to 100 parts by mass of the sum of the cyclic compound (a) and the episulfide compound (b).

[3] The photocurable composition according to either one of [1] and [2], wherein the photopolymerization initiator (c) is a photobase generator.

[4] The photocurable composition according to any one of [1] to [3] comprising 0.1-20 parts by mass of a thiol compound (d) to 100 parts by mass of the sum of the cyclic compound (a) and the episulfide compound (b).

[5] The photocurable composition according to any one of [1] to [4] comprising 0.001-1 parts by mass of an acidic compound (e) to 100 parts by mass of the sum of the cyclic compound (a) and the episulfide compound (b).

[6] The photocurable composition according to any one of [1] to [5], wherein a refractive index as measured by a sodium D-line after curing the photocurable composition is 1.73 or higher.

[7] The photocurable composition according to any one of [1] to [6], wherein X in Formula (1) above is S.

[8] The photocurable composition according to any one of [1] to [7], wherein the cyclic compound (a) is one or more types selected from the group consisting of 1,2-dithietane, trithietane, 1,2-dithiolane, 1,2,3-trithiolane, 1,2,4-trithiolane, tetrathiolane, 1,2-dithiane, 1,2,3-trithiane, 1,2,4-trithiane, 1,3,5-trithiane, 1,2,3,4-tetrathiane, 1,2,4,5-tetrathiane, pentathiane, 1,2,3-trithiepane, 1,2,4-trithiepane, 1,2,5-trithiepane, 1,2,3,4-tetrathiepane, 1,2,3,5-tetrathiepane, 1,2,4,5-tetrathiepane, 1,2,4,6-tetrathiepane, 1,2,3,4,5-pentathiepane, 1,2,3,4,6-pentathiepane, 1,2,3,5,6-pentathiepane and hexathiepane.

[9] The photocurable composition according to any one of [1] to [8], wherein the episulfide compound (b) has a structure represented by Formula (2):

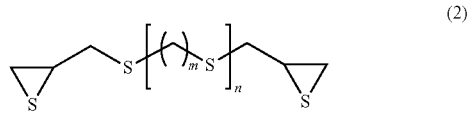

(2)

wherein, m represents an integer of 0-4 and n represents an integer of 0-2.

[10] The photocurable composition according to any one of [1] to [9], which does not contain elemental sulfur.

[11] A resin obtained by curing the photocurable composition according to any one of [1] to [10].

[12] An optical material comprising the resin according to [11].

Effects of Invention

Since a photocurable composition of the present invention has sufficient photo curability and a cured product thereof has a refractive index (nD) as high as 1.73 or higher, a high-performance optical material can be provided.

EMBODIMENTS FOR CARRYING OUT INVENTION

A photocurable composition of the present invention comprises a cyclic compound (a), an episulfide compound (b) and a photopolymerization initiator (c).

Hereinafter, raw materials used for the present invention, i.e., the cyclic compound (a), the episulfide compound (b), the photopolymerization initiator (c) and compounds that can be added to the photocurable composition will be described in detail.

The cyclic compound (a) used for the present invention has a structure represented by Formula (1) below:

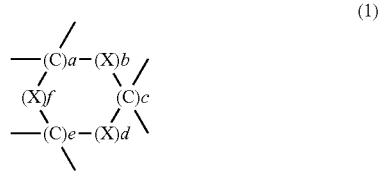

(1)

wherein, C represents a carbon atom, X represents S, Se or Te, a to f each represents an integer of 0-3 provided that 8≥(a+c+e)≥1, 8≥(b+d+f)≥2, and (b+d+f)≥(a+c+e).

Conventionally, cyclic sulfur S8 is known to contribute to improvement of the refractive index of a thermosetting composition, but it is unfavorable to be used for a photocurable composition since it has a radical-inhibiting property and inhibits photoactive species. Meanwhile, the cyclic compound (a) used for the present invention is a compound whose optical-activity-inhibiting property which is considered as a defect is improved while retaining the advantages as a cyclic sulfur compound.

X in Formula (1) above is preferably S or Se in terms of availability and toxicity, and more preferably S.

a to f are preferably 6≥(a+c+e)≥1, 7≥(b+d+f)≥2, and more preferably 5≥(a+c+e)≥1, 7≥(b+d+f)≥2 in terms of availability, refractive index and low optical-activity-inhibiting property.

Furthermore, in order to acquire a high refractive index, the sum of S, Se and Te in the cyclic compound (a) is preferably 50 mass % or higher and less than 90 mass %. Specifically, if the proportion of X in the cyclic compound (a) is too large, the photoactive-species-inhibiting property becomes too high like the case of elemental sulfur whereas if the proportion of X is too small, improvement of the refractive index becomes too weak, which are unfavorable.

Moreover, in order to acquire good photocurability, sulfur contained as impurities in the cyclic compound (a) is preferably 1 mass % or less. If too much sulfur as impurities is contained in the cyclic compound (a), the photoactive-species-inhibiting property becomes high.

Specific examples of the cyclic compound (a) include, but not limited to, the followings:

dithiirane, 1,2-dithietane, 1,3-dithietane, trithietane, 1,2-dithiolane, 1,3-dithiolane, 1,2,3-trithiolane, 1,2,4-trithiolane, tetrathiolane, 1,2-dithiane, 1,3-dithiane, 1,4-dithiane, 1,2,3-trithiane, 1,2,4-trithiane, 1,3,5-trithiane, 1,2,3,4-tetrathiane, 1,2,4,5-tetrathiane, bis(1,2,3,5,6-pentathiepano)methane, tris(1,2,3,5,6-pentathiepano)methane, 1,2-dithiepane, 1,3-dithiepane, 1,4-dithiepane, 1,2,3-trithiepane, 1,2,4-trithiepane, 1,2,5-trithiepane, 1,3,5-trithiepane, 1,2,3,4-tetrathiepane, 1,2,3,5-tetrathiepane, 1,2,4,5-tetrathiepane, 1,2,4,6-tetrathiepane, 1,2,3,4,5-pentathiepane, 1,2,3,4,6-pentathiepane, 1,2,3,5,6-pentathiepane, hexathiepane, diselecyclobutane, triselecyclobutane, diselecyclopentane, triselecyclopentane, tetraselecyclopentane, diselecyclohexane, triselecyclohexane, tetraselecyclohexane, pentaselecyclohexane, diselecycloheptane, triselecycloheptane, tetraselecycloheptane, pentaselecycloheptane, hexaselecycloheptane, ditellurocyclobutane, tritellurocyclobutane, ditellurocyclopentane, tritellurocyclopentane, tetratellurocyclopentane, ditellurocyclohexane, tritellurocyclohexane, tetratellurocyclohexane, pentatellurocyclohexane, ditellurocycloheptane, tritellurocycloheptane, tetratellurocycloheptane, pentatellurocycloheptane, hexatellurocycloheptane and derivatives having cyclic skeleton structures thereof (compounds in which hydrogen atoms are replaced with various substituents).

Specific examples of the preferable cyclic compound (a) include 1,2-dithietane, trithietane, 1,2-dithiolane, 1,2,3-trithiolane, 1,2,4-trithiolane, tetrathiolane, 1,2-dithiane, 1,2,3-trithiane, 1,2,4-trithiane, 1,3,5-trithiane, 1,2,3,4-tetrathiane, 1,2,4,5-tetrathiane, pentathiane, 1,2,3-trithiepane, 1,2,4-trithiepane, 1,2,5-trithiepane, 1,2,3,4-tetrathiepane, 1,2,3,5-tetrathiepane, 1,2,4,5-tetrathiepane, 1,2,4,6-tetrathiepane, 1,2,3,4,5-pentathiepane, 1,2,3,4,6-pentathiepane, 1,2,3,5,6-pentathiepane, hexathiepane and derivatives having the cyclic skeleton structures thereof (wherein hydrogen atoms are replaced with various substituents) because of their availability and ease of synthesis and because they give a composition with a high refractive index, and particularly preferably include 1,2,4,5-tetrathiane and 1,2,3,5,6-pentathiepane because of solubility in the episulfide compound (b).

The method for obtaining the cyclic compound (a) is not particularly limited. The cyclic compound (a) may be a commercial product, may be collected or extracted from a natural product such as crude oil, plants and animals, or may be synthesized by a known method.

Exemplary synthesis methods include N. Takeda et al., Bull. Chem. Soc. Jpn., 68, 2757 (1995), F. Feher et al., Angew. Chem. Int. Ed., 7, 301 (1968), and G. W. Kutney et al., Can. J. Chem, 58, 1233 (1980).

The proportion of the cyclic compound (a) in the photocurable composition is preferably 5-80 mass %, and more preferably 30-70 mass %. If the proportion of the cyclic compound (a) is less than 5 mass %, the effect of improving the refractive index becomes too weak, whereas if the proportion exceeds 80 mass %, transparency of the resulting optical material may be deteriorated.

The episulfide compound (b) used for the present invention comprises any episulfide compound.

Hereinafter, specific examples of the episulfide compound (b) will be recited by compounds having a linear aliphatic skeleton, a cyclic aliphatic skeleton or an aromatic skeleton, although the episulfide compound (b) is not limited thereto.

Examples of compounds having a linear aliphatic skeleton include compounds represented by Formula (2) below.

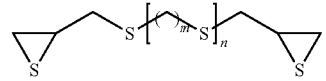
(2)

wherein, m represents an integer of 0-4, and n represents an integer of 0-2.

Specific examples include bis(β-epithiopropyl)sulfide (where n=0 in Formula (2) above), bis(β-epithiopropyl)disulfide (where m=0, n=1 in Formula (2) above), bis(β-epithiopropylthio)methane (where m=1, n=1 in Formula (2) above), 1,2-bis(β-epithiopropylthio)ethane (where m=2, n=1 in Formula (2) above), 1,3-bis(β-epithiopropylthio)propane (where m=3, n=1 in Formula (2) above), 1,4-bis(β-epithiopropylthio)butane (where m=4, n=1 in Formula (2) above) and bis(β-epithiopropylthioethyl)sulfide (where m=2, n=2 in Formula (2) above).

Examples of compounds having a cyclic aliphatic skeleton include compounds represented by Formula (3) or (4) below.

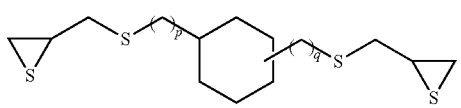
(3)

p and q each independently represent an integer of 0-4.

Specific examples include 1,3- and 1,4-bis(β-epithiopropylthio)cyclohexane (where p=0, q=0 in Formula (3) above), and 1,3- and 1,4-bis(β-epithiopropylthiomethyl)cyclohexane (where p=1, q=1 in Formula (3) above).

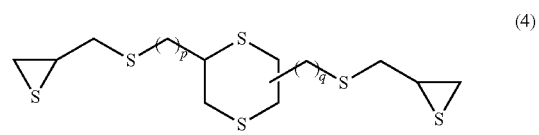
(4)

p and q each independently represent an integer of 0-4.

Specific examples include 2,5-bis(β-epithiopropylthio)-1,4-dithiane (where p=0, q=0 in Formula (4) above), and 2,5-bis(β-epithiopropylthioethylthiomethyl)-1,4-dithiane (where p=1, q=1 in Formula (4) above).

Examples of the compound having an aromatic skeleton include compounds represented by Formula (5), (6) or (7) below.

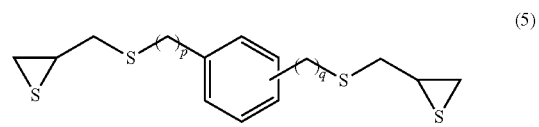
(5)

p and q each independently represent an integer of 0-4.

Specific examples include 1,3- and 1,4-bis(β-epithiopropylthio)benzene (where p=0, q=0 in Formula (5) above), and 1,3- and 1,4-bis(β-epithiopropylthiomethyl)benzene (where p=1, q=1 in Formula (5) above).

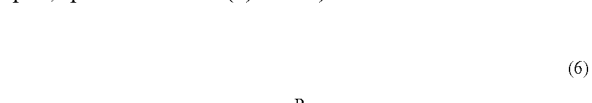
(6)

$R_1$ and $R_2$ each independently represent a hydrogen atom, a methyl group, an ethyl group or a phenyl group.

Specific examples include a bisphenol-F episulfide compound where $R_1$ and $R_2$ are both hydrogen atoms, and a bisphenol-A episulfide compound where $R_1$ and $R_2$ are both methyl groups.

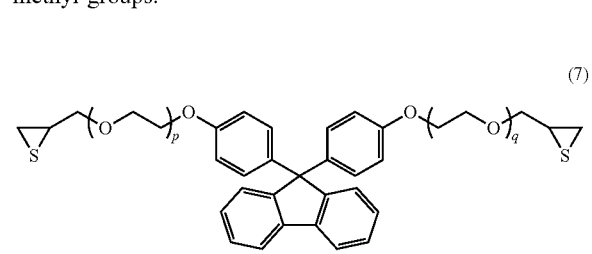
(7)

p and q each independently represent an integer of 0 or 1.

Specific examples include a compound represented by Formula (7) above wherein p=0, q=0, and a compound represented by Formula (7) above wherein p=1, q=1.

These may be used alone or two or more types of them may be used as a mixture.

Preferable compounds in terms of availability are compounds represented by Formula (2) above having a linear aliphatic skeleton, and particularly preferable compounds are bis(β-epithiopropyl)sulfide (where n=0 in Formula (2)) and bis(β-epithiopropyl)disulfide (where m=0, n=1 in Formula (2)).

The method for obtaining the episulfide compound (b) is not particularly limited. It may be a commercial product or may be synthesized by a known method. For example, bis(β-epithiopropyl)sulfide (where n=0 in Formula (2)) may be synthesized according to a known technique (U.S. Pat. No. 3,491,660).

The proportion of the episulfide compound (b) in 100 mass % of the photocurable composition is preferably 20-95 mass % and more preferably 20-70 mass %. If the episulfide compound (b) is less than 20 mass %, reaction with the cyclic compound (a) may be insufficient. If the proportion of the episulfide compound (b) exceeds 95 mass %, the effect of the cyclic compound (a) to enhance the refractive index becomes low.

The photopolymerization initiator (c) used for the present invention is not particularly limited as long as it can photocure the episulfide compound. For example, a radical generator, an acid generator, a base generator or the like can be used. Use of a base generator is most favorable since it has the highest basic catalyst activity for polymerization of the episulfide compound.

The proportion of the photopolymerization initiator (c) in the photocurable composition is preferably 0.1-10 parts by mass to 100 parts by mass of the sum of the cyclic compound (a) and the episulfide compound (b). If the proportion of the photopolymerization initiator (c) is less than 0.1 parts by mass, photocurability becomes low whereas if it exceeds 10 parts by mass, the refractive index of the cured product may be largely decreased.

Additionally, according to the present invention, a thiol compound (d) can be added to the photocurable composition. Addition of the thiol compound (d) extends the usable time (pot life) of the photocurable composition, and improves the hue of the optical material obtained by photocuring. The thiol compound (d) used by the present invention comprises any thiol compound.

In terms of availability and obtaining a high refractive index for the photocurable composition, polyfunctional thiol compounds represented by General formulae (8) to (10) below are favorable.

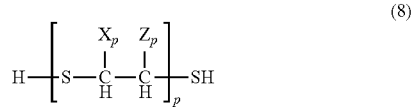

(8)

wherein, p represents an integer of 2-4, and $X_p$ and $Z_p$ each independently represent a hydrogen atom or a methylthiol group.

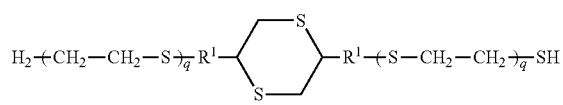

(9)

wherein, q represents an integer of 0-3, and $R^1$ represents an alkylene group with a carbon number of 0-3.

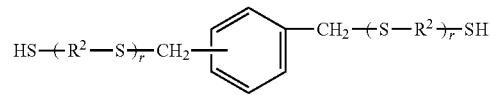

(10)

wherein, r represents an integer of 0-3, and $R^2$ represents an alkylene group with a carbon number of 1-3.

As to $X_p$ and $Z_p$ in General formula (8) above, for example, when p=2, $X_1$, $X_2$, $Z_1$ and $Z_2$ represent independent substituents.

Examples of the compound represented by General formula (8) include 1,5-dimercapto-3-thiapentane, 2-mercaptomethyl-1,5-dimercapto-3-thiapentane, 2,4-bis(mercaptomethyl)-1,5-dimercapto-3-thiapentane, 4-mercaptomethyl-1,8-dimercapto-3,6-dithiaoctane, 4,8-bis(mercaptomethyl)-1,11-dimercapto-3,6,9-trithiaundecane, 4,7-bis(mercaptomethyl)-1,11-dimercapto-3,6,9-trithiaundecane, and 5,7-bis(mercaptomethyl)-1,11-dimercapto-3,6,9-trithiaundecane.

Examples of the compound represented by General formula (9) include 2,5-dimercapto-1,4-dithiane, 2,5-dimercaptomethyl-1,4-dithiane, and 2,5-dimercaptoethyl-1,4-dithiane.

Examples of the compound represented by General formula (10) include xylylene dithiol and else.

Examples of preferable thiol compounds other than the compounds represented by General formulae (8) to (10) include ethylene glycol bis(3-mercaptopropionate), trimethylolpropane tris(3-mercaptopropionate), pentaerythritol tetrakis(3-mercaptopropionate), pentaerythritol tetrakis(3-mercaptobutyrate), benzenedithiol and tolylenedithiol.

According to the present invention, the added amount of the thiol compound (d) is preferably 0.1-20 parts by mass, more preferably 0.5-12 parts by mass and particularly preferably 1-10 parts by mass to 100 parts by mass of the sum of the cyclic compound (a) and the episulfide compound (b). If it is less than 0.1 parts by mass, the effects of extending the usable time and improving color tone cannot be achieved whereas if it exceeds 20 parts by mass, the resulting cured product may be soft.

According to the present invention, the photocurable composition preferably does not contain elemental sulfur. This is because if the amount of cyclic sulfur S8 or the like is large, the refractive index can be improved but the optically active species will be quenched since it acts as a radical inhibitor.

Furthermore, according to the present invention, an acidic compound (e) can be added to the photocurable composition. Addition of the acidic compound (e) will improve stability of the cyclic compound (a) in a dark place and will extend usable time of the photocurable composition. The acidic compound (e) used for the present invention is not particularly limited as long as it can be dissolved in the photocurable composition.

As the acidic compound (e), various protonic acids and Lewis acids can be used.

As the protonic acids, organic acids having a sulfonate group, a carboxylic acid group or a phosphate group are particularly preferable in terms of solubility in the composition liquid. Specific examples of the particularly preferable compounds include methanesulfonic acid, trifluoromethanesulfonic acid, benzenesulfonic acid, toluenesulfonic acid, dodecylbenzenesulfonic acid, camphorsulfonic acid, formic acid, acetic acid, propionic acid, butyric acid, benzoic acid, phthalic acid, oxalic acid, ethyl phosphate, diethyl phosphate, butyl phosphate, dibutyl phosphate, ethyl phosphate, diethyl phosphate, butoxyethyl phosphate, and dibutoxyethyl phosphate.

Specific examples of compounds preferable as Lewis acids include dibutyltin dichloride, butyltin trichloride, dioctyltin dichloride, octyltin trichloride, dibutyl dichlorogermanium, butyl trichlorogermanium, diphenyl dichlorogermanium, phenyl trichlorogermanium and triphenylantimony dichloride, where a particularly preferable compound is dibutyltin dichloride. The acidic compound (e) may be used alone of two or more types of them may be used as a mixture. The used amount of the acidic compound (e) is preferably 0.001-1 parts by mass, more preferably 0.001-0.2 parts by mass and most preferably 0.005-0.1 parts by mass to 100 parts by mass of the sum of the cyclic compound (a) and the episulfide compound (b). If the added amount is less than 0.001 parts by mass, the stabilizing effect will be small whereas if the added amount exceeds 1 parts by mass, photocurability may be deteriorated.

Moreover, according to the present invention, a sensitizer (f) may be added to the photocurable composition. By blending the sensitizer (f) to the photocurable composition, the base can more efficiently be liberated from the photopolymerization initiator (c). As a result, exposure time can be shortened and polymerization of the photocurable composition can be promoted.

Preferable sensitizers (f) are aromatic ketones or oxazines such as optionally substituted benzophenone, thioxanthone and anthraquinone, dyes such as acridine, phenazine and rhodamine and conjugated heterocyclic compounds such as fluorene, fluorenone and naphthalene. Particularly preferable sensitizers (f) are optionally substituted benzophenone, thioxanthone and fluorene.

Specific examples include benzophenone, 4,4'-bis(dimethylamino)benzophenone, 4,4'-bis-(diethylamino)benzophenone, 4,4'-bis(ethylmethylamino)benzophenone, 4,4'-diphenylbenzophenone, 4,4'-diphenoxybenzophenone, 4,4'-bis(p-isopropylphenoxy)benzophenone, 4-methylbenzophenone, 2,4,6-trimethylbenzophenone, 4-phenylbenzophenone, 2-methoxycarbonylbenzophenone, 4-benzoyl-4'-methyldiphenylsulfide, 4-methoxy-3,3'-methylbenzophenone, isopropylthioxanthone, chlorothioxanthone, 1-chloro-4-propoxythioxanthone, 2-(trifluoromethyl) thioxanthone, 2,4-dimethylthioxanthone, 2,4-diethylthioxanthone, 1,3-dimethyl-2-(2-ethylhexyloxy) thioxanthone, fluorene, 9,9-dimethylfluorene and 9,9-bis[4-(2-hydroxyethoxy)phenyl]fluorene, which may be used alone or two or more of them may be used as a mixture.

The used amount of the sensitizer (f) is preferably 0.05-10 parts by mass, more preferably 0.05-3 parts by mass and most preferably 0.1-1 parts by mass to 100 parts by mass of the sum of the cyclic compound (a) and the episulfide compound (b).

In addition, for the purpose of improving various performances such as weather resistance, oxidation resistance, strength, surface hardness, adhesion with a substrate, refractive index and dyeability, an epoxy compound, an iso(thio) cyanate, a phenol, an amine or the like may be added to the photocurable composition of the present invention. In this case, a known polymerization curing catalyst may further be added as needed. Furthermore, in order to prepare an optical material of the present invention, a thermosetting catalyst, an antioxidant, a bluing agent, an ultraviolet absorber, various performance-improving additives and the like may be added as needed. The added amount of these additives is usually 0.0001-5 parts by mass to 100 parts by mass of the sum of the photocurable composition.

The photocurable composition of the present invention can be cured by being irradiated with ultraviolet or visible rays. The light source used for this is not particularly limited as long as it is an equipment that can generate ultraviolet or visible rays. Specific examples include a high-pressure mercury lamp, an ultra-high-pressure mercury lamp, a metal halide lamp, a high power metal halide lamp, a xenon lamp and a light emitting diode (ultraviolet LED).

The photocurable composition of the present invention may be susceptible to polymerization inhibition caused by oxygen in the air upon photocuring. Therefore, in order to shorten the exposure time or in order to sufficiently polymerize the photocurable composition, exposure is preferably carried out in an atmosphere with a low oxygen concentration. Specifically, exposure is carried out, for example, by exchanging with an inert gas such as nitrogen gas, argon gas or helium gas or under reduced pressure. The oxygen concentration upon this is preferably 10% or less and more preferably 5% or less.

In addition, exposure may be carried out by coating the surface of the photocurable composition with a transparent film such as a polypropylene film, or by injecting and enclosing the photocurable composition in a transparent mold made of glass or the like.

The photocurable composition is irradiated with ultraviolet or visible light and then subjected to a heat treatment so that curing is further promoted. The heating temperature and time may appropriately be selected after the ultraviolet irradiation according to the degree of curing required for the optical material, where the heating temperature is preferably room temperature to 150° C. and the heating time is preferably 1 minute to 3 days.

EXAMPLES

Hereinafter, the present invention will be described specifically by way of examples, although the present invention should not be limited thereto. In the examples, the episulfide compound (b) was synthesized based on the methods described in Japanese Unexamined Patent Application Publication No. H09-110979 and Japanese Unexamined Patent Application Publication No. 2001-163874. 5-(3-Methoxybenzyl)-1,5-diazabicyclo[4,3,0]nonane was synthesized based on the method described in Japanese Unexamined Patent Application Publication (translation of PCT) No. 2005-511536. Tetrabutylammonium butyltri(1-naphtyl)borate was obtained from Showa Denko K.K. and used directly. 4-Benzoyl-4'-methyldiphenylsulfide was obtained from DKSH Japan under the product name of Lunacure BMS (hereinafter, referred to as "BMS") and used directly. Bis(2-mercaptoethyl)sulfide was obtained from Tokyo Chemical Industry Co., Ltd., pentaerythritol tetrakisthiopropionate was obtained from Yodo Kagaku Co., Ltd. and dibutyltin dichloride was obtained from Tokyo Chemical Industry Co., Ltd., and used directly.

[Evaluation Methods]

As the light source used for the exposure of the photocurable composition, an UV-LED lighting equipment (LH-PUV365/2501 from Iwasaki Electric Co., Ltd., light intensity 30 mW/cm$^2$) was used.

The photocurability of the photocurable composition was evaluated by holding the photocurable composition between two glass slides (S9213 from Matsunami Glass Ind., Ltd.) to have a thickness of 2-10 μm and irradiating the composition with light with the UV-LED lighting equipment for a minute to evaluate whether or not curing can take place without leaving tack (stickiness) on the surface, where it was evaluated "good" if the composition was cured and "poor" when the composition was uncured.

The refractive index (nD) of the cured product was determined as a value at the D line with an Abbe's refractometer ("NAR-4T" from Atago Co., Ltd.). The cured product to be measured was prepared by sandwiching a photocurable composition together with a spacer between two glass slides to have a thickness of 200-300 μm and irradiating the resultant for 5 minutes with the UV-LED lighting equipment. The measurement temperature was set to 20° C.

The usable time of the photocurable composition was evaluated "very good" when the viscosity obtained after leaving the composition in a dark place at 20° C. for 3 hours was less than 500 mPa·s, "good" when the viscosity was 500 mPa·s or higher and less than 1,000 mPa·s, "usable" when the viscosity was 1,000 mPa·s or higher and less than 5,000 mPa·s, and "poor" when the viscosity was 5,000 mPa·s or higher. For the viscosity measurement, Corn/Plate version viscometer HADV-II+Pro (from Brookfield) was used.

Synthesis Example 1

1,2,3,5,6-Pentathiepane represented by the following structural formula was synthesized by the following procedure according to a method described in a publication (H. C. Hansen et al., Tetrahedron, 41, 5145 (1985)).

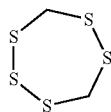

1.33 mol (146.6 g) of sodium disulfide and 1000 ml of ethanol were mixed under nitrogen gas stream in a reaction flask equipped with an agitator, a dropping funnel and a thermometer. To this, 1000 ml of an ethanol solution of 1.35 mol (102.8 g) of carbon disulfide was dropped using an ice bath by spending 20 minutes while maintaining at 35-40° C. At this temperature, agitation was carried out for 2 hours.

After confirming that the reaction liquid become a reddish orange suspension, 1.50 mol (409.5 g) of diiodomethane was dropped by spending 20 minutes, and agitation was further carried out for 2 hours. After confirming that the reaction liquid become a pale yellow suspension, the reaction was terminated.

Following the reaction, the resultant was extracted with diethyl ether, the extract was washed with water and the solvent was distilled away to give a yellow liquid product. This product was purified by silica gel column chromatography using hexane as an eluting solvent to give 10.6 g of a solid product.

Based on the melting point (61-62° C.) and the results from mass spectrometry, NMR analysis and IR analysis, the product was confirmed to be 1,2,3,5,6-pentathiepane.

Synthesis Example 2

1,2,4,5-Tetrathiane represented by the following structural formula was synthesized by the following procedure according to a method described in a publication (Mahabir Parshad Kaushik et al., Chemistry Letters, 35, 1048 (2006)).

1.00 mol (80.16 g) of methanedithiol, 1000 ml of methylene chloride and 0.05 mol (5.45 g) of silyl chloride were agitated under an oxygen atmosphere at 0° C. for 10 minutes in a reaction flask equipped with an agitator. Following the reaction, the resultant was extracted with diethyl ether, the extract was washed with water and the solvent was distilled away to give a yellow liquid product. This product was purified by silica gel column chromatography using hexane as an eluting solvent to give 70.3 g of a solid product.

Based on the melting point (67-68° C.) and the results from mass spectrometry, NMR analysis and IR analysis, the product was confirmed to be 1,2,4,5-tetrathiane.

Example 1

30 parts by mass of 1,2,3,5,6-pentathiepane obtained above (hereinafter, compound "a-1") as a cyclic compound (a) and 70 parts by mass of bis(β-epithiopropyl)sulfide (hereinafter, compound "b-1") as an episulfide compound (b), together with 1 parts by mass of 5-(3-methoxybenzyl)-1,5-diazabicyclo[4,3,0]nonane (hereinafter, compound "c-1") as a photopolymerization initiator (c) and 1 parts by mass of 4-benzoyl-4'-methyldiphenylsulfide (hereinafter, compound "f-1") as a sensitizer (f) with respect to 100 parts by mass of the sum of the compounds a-1 and b-1 were added and agitated at 30° C. to give a homogenous solution. The resultant was filtrated through a PTFE filter having a pore size of 0.45 μm to give a photocurable composition liquid. The photocurability, the usable time and the refractive index after the curing of the resulting photocurable composition liquid are shown in Table 1.

Examples 2 and 3

Composition liquids were prepared and evaluated in the same manner as Example 1 except that the compounds and composition ratios shown in Table 1 were used. The photocurability, the usable time and the refractive index after the curing of the resulting photocurable composition liquids are shown in Table 1.

Examples 4-6

Tetrabutylammonium butyltri(1-naphtyl)borate (hereinafter, compound "c-2") as a photopolymerization initiator (c) was used to prepare composition liquids in the same manner as Example 1 except that the composition ratios shown in Table 1 was used. The photocurability, the usable time and the refractive index after the curing of the resulting photocurable composition liquids are shown in Table 1.

Examples 7-10

Bis(2-mercaptoethyl)sulfide (hereinafter, compound "d-1") or pentaerythritol tetrakisthiopropionate (hereinafter, compound "d-2") was used as a thiol compound (d) to prepare and evaluate composition liquids in the same manner as Example 2 or 5 except that the composition ratios shown in Table 1 were used. The photocurability, the usable time and the refractive index after the curing of the resulting photocurable composition liquids are shown in Table 1.

Examples 11-14

An acetic acid (hereinafter, compound "e-1") or (+)-10-camphorsulfonic acid (hereinafter, compound "e-2") was used as an acidic compound (e) to prepare and evaluate composition liquids in the same manner as Example 2 or 7 except that the composition ratios shown in Table 1 were used. The photocurability, the usable time and the refractive index after the curing of the resulting photocurable composition liquids are shown in Table 1.

Example 15

1,2,4,5-Tetrathiane (hereinafter, compound "a-2") obtained above was used as a cyclic compound (a) to prepare and evaluate a composition liquid in the same manner as Example 1 except that the composition ratio shown in Table 1 was used. The photocurability, the usable time and the refractive index after the curing of the resulting photocurable composition liquid are shown in Table 1.

Example 16

A suitable amount of a photocurable composition liquid prepared in the same manner as Example 12 was dropped on a lanthanum dense flint glass (LASFN7 from SCHOTT AG, refractive index 1.75), which was sandwiched between glass plates together with a 100-µm-thick PET film and irradiated with light for 3 minutes with a UV-LED lighting equipment. The glass plates and the PET film were removed to obtain a lanthanum dense flint glass coated with an about 100-µm-thick coating. The interface between the substrate and the resin was unnoticeable, and the appearance was good. The appearance of the obtained coated substrate is shown in Table 2.

Example 17

Sapphire glass coated with a coat with a thickness of about 100 µm was obtained in the same manner as Example 16 except that sapphire glass (refractive index 1.76) was used as a material to be coated. The interface between the substrate and the resin was unnoticeable, and the appearance was good. The appearance of the obtained coated substrate is shown in Table 2.

Example 18

A suitable amount of a photocurable composition liquid prepared in the same manner as Example 12 was dropped on a lanthanum dense flint glass (LASFN7), on which a nickel die having prism rows formed thereon (vertical angle 90°, pitch 50 µm) was placed and the resultant was irradiated with light for 3 minutes with a UV-LED lighting equipment from the lanthanum dense flint glass side. When the lanthanum dense flint glass having the structure transferred thereon was released from the die after the light irradiation, the cured product was not left on the die and mold releasability was good. By the above-described procedure, optical glass having the prism rows transferred thereon was prepared. The surface structure of the optical glass was observed with a SEM (scanning electron microscopy) to find that the prism structure of the die was accurately transferred and that transferability was good. The mold releasability and the transferability of the resulting sample are shown in Table 3.

Example 19

An optical glass having the prism rows transferred thereon was prepared in the same manner as Example 18 expect that sapphire glass was used as a material to be coated. The surface structure of the optical glass was observed with a SEM (scanning electron microscopy) to find that the prism structure of the die was accurately transferred and that transferability was good. The mold releasability and the transferability of the resulting sample are shown in Table 3.

Comparative Example 1

A composition liquid was prepared and evaluated in the same manner as Example 1 except that a cyclic compound (a) was not used and the composition ratio shown in Table 4 was used. While the photocurability and the usable time were good, the refractive index (nD) after the curing was 1.70 which was inferior as compared to that of Example 1. The photocurability, the usable time and the refractive index after the curing of the obtained photocurable composition liquid are shown in Table 4.

Comparative Example 2

A composition liquid was prepared and evaluated in the same manner as Comparative example 1 except that elemental sulfur was added and dissolved in the composition liquid at the composition ratio shown in Table 4. The resulting composition liquid was still in a liquid state after 60 seconds of light irradiation. The photocurability of the obtained photocurable composition liquid is shown in Table 4.

Comparative Examples 3 and 4

Composition liquids were prepared and evaluated in the same manner as Example 1 except that a cyclic sulfur compound with a low sulfur content was used instead of using a cyclic compound (a) at the composition ratio shown in Table 4. While the photocurability and the usable time were good, the refractive index (nD) after the curing was inferior as compared to that of Example 1. The photocurability, the usable time and the refractive index after the curing of the obtained photocurable composition liquids are shown in Table 4. The cyclic sulfur compound with a low sulfur content used in Comparative examples 3 and 4 does not satisfy the requirement (b+d+f)≥(a+c+e) in Formula (1).

Comparative Example 5

The photocurable composition liquid prepared in the same manner as Comparative example 1 was deposited on lanthanum dense flint glass (LASFN7) to obtain lanthanum dense flint glass coated with a coat with a thickness of about 100 µm in the same manner as Example 16. The interface between the substrate and the resin was visually confirmed in an instant, and the appearance was poor. The appearance of the obtained coated substrate is shown in Table 5.

Comparative Example 6

A photocurable composition liquid prepared in the same manner as Comparative example 1 was deposited on sapphire glass to obtain sapphire glass coated with a coat with a thickness of about 100 μm in the same manner as Example 16. The interface between the substrate and the resin was visually confirmed in an instant, and the appearance was poor. The appearance of the obtained coated substrate is shown in Table 5.

TABLE 1

| | Cyclic compound (a) (parts by mass) | Episulfide compound (b) (parts by mass) | Photopolymerization initiator (c) (parts by mass) | Thiol compound (d) (parts by mass) | Acidic compound (e) (parts by mass) | Photosensitizer (f) (parts by mass) | Photocurability | Usable time | Refractive index after curing (nD) |
|---|---|---|---|---|---|---|---|---|---|
| Example 1 | a-1 (30) | b-1 (70) | c-1 (1) | | | f-1 (1) | Good | Usable | 1.73 |
| Example 2 | a-1 (50) | b-1 (50) | c-1 (1) | | | f-1 (1) | Good | Usable | 1.76 |
| Example 3 | a-1 (70) | b-1 (30) | c-1 (1) | | | f-1 (1) | Good | Usable | 1.79 |
| Example 4 | a-1 (30) | b-1 (70) | c-2 (1) | | | f-1 (1) | Good | Good | 1.73 |
| Example 5 | a-1 (50) | b-1 (50) | c-2 (1) | | | f-1 (1) | Good | Good | 1.76 |
| Example 6 | a-1 (70) | b-1 (30) | c-2 (1) | | | f-1 (1) | Good | Good | 1.79 |
| Example 7 | a-1 (50) | b-1 (45) | c-1 (1) | d-1 (5) | | f-1 (1) | Good | Good | 1.76 |
| Example 8 | a-1 (50) | b-1 (45) | c-1 (1) | d-2 (5) | | f-1 (1) | Good | Good | 1.75 |
| Example 9 | a-1 (50) | b-1 (45) | c-2 (1) | d-1 (5) | | f-1 (1) | Good | Very good | 1.76 |
| Example 10 | a-1 (50) | b-1 (45) | c-2 (1) | d-2 (5) | | f-1 (1) | Good | Very good | 1.75 |
| Example 11 | a-1 (50) | b-1 (50) | c-1 (1) | | e-1 (0.02) | f-1 (1) | Good | Good | 1.76 |
| Example 12 | a-1 (50) | b-1 (45) | c-1 (1) | d-1 (5) | e-1 (0.02) | f-1 (1) | Good | Very good | 1.76 |
| Example 13 | a-1 (50) | b-1 (50) | c-1 (1) | | e-2 (0.02) | f-1 (1) | Good | Good | 1.76 |
| Example 14 | a-1 (50) | b-1 (45) | c-1 (1) | d-1 (5) | e-2 (0.02) | f-1 (1) | Good | Very good | 1.76 |
| Example 15 | a-2 (30) | b-1 (70) | c-1 (1) | | | f-1 (1) | Good | Usable | 1.73 | a-1: 1,2,3,5,6-Pentathiepane
a-2: 1,2,4,5-Tetrathiane
b-1: Bis(β-epithiopropyl)sulfide
c-1: 5-(3-Methoxybenzyl)-1,5-diazabicyclo[4,3,0]nonane
c-2: Tetrabutylammonium butyltri(1-naphtyl)borate
d-1: Bis(2-mercaptoethyl)sulfide
d-2: Pentaerythritol tetrakisthiopropionate
e-1: Acetic acid
e-2: (+)-10-Camphorsulfonic acid
f-1: 4-Benzoyl-4'-methyldiphenylsulfide

TABLE 2

| | Cyclic compound (a) (parts by mass) | Episulfide compound (b) (parts by mass) | Photopolymerization initiator (c) (parts by mass) | Thiol compound (d) (parts by mass) | Acidic compound (e) (parts by mass) | Photosensitizer (f) (parts by mass) | Substrate | Appearance |
|---|---|---|---|---|---|---|---|---|
| Example 16 | a-1 (50) | b-1 (45) | c-1 (1) | d-1 (5) | e-1 (0.02) | f-1 (1) | LASFN7 | Good |
| Example 17 | a-1 (50) | b-1 (45) | c-1 (1) | d-1 (5) | e-1 (0.02) | f-1 (1) | Sapphire | Good | a-1: 1,2,3,5,6-Pentathiepane
b-1: Bis(β-epithiopropyl)sulfide
c-1: 5-(3-Methoxybenzyl)-1,5-diazabicyclo[4,3,0]nonane
d-1: Bis(2-mercaptoethyl)sulfide
e-1: Acetic acid
f-1: 4-Benzoyl-4'-methyldiphenylsulfide

TABLE 3

| | Cyclic compound (a) (parts by mass) | Episulfide compound (b) (parts by mass) | Photopolymerization initiator (c) (parts by mass) | Thiol compound (d) (parts by mass) | Acidic compound (e) (parts by mass) | Photosensitizer (f) (parts by mass) | Substrate | Mold releasability | Transferability |
|---|---|---|---|---|---|---|---|---|---|
| Example 18 | a-1 (50) | b-1 (45) | c-1 (1) | d-1 (5) | e-1 (0.02) | f-1 (1) | LASFN7 | Good | Good |
| Example 19 | a-1 (50) | b-1 (45) | c-1 (1) | d-1 (5) | e-1 (0.02) | f-1 (1) | Sapphire | Good | Good | a-1: 1,2,3,5,6-Pentathiepane
b-1: Bis(β-epithiopropyl)sulfide
c-1: 5-(3-Methoxybenzyl)-1,5-diazabicyclo[4,3,0]nonane
d-1: Bis(2-mercaptoethyl)sulfide
e-1: Acetic acid
f-1: 4-Benzoyl-4'-methyldiphenylsulfide

TABLE 4

|  | Cyclic sulfur compound (parts by mass) | Episulfide compound (b) (parts by mass) | Photopolymerization initiator (c) (parts by mass) | Photosensitizer (f) (parts by mass) | Sulfur (parts by mass) | Photocurability | Usable time | Refractive index after curing (nD) |
|---|---|---|---|---|---|---|---|---|
| Comparative example 1 |  | b-1 (100) | c-1 (1) | f-1 (1) |  | Good | Very good | 1.70 |
| Comparative example 2 |  | b-1 (100) | c-1 (1) | f-1 (1) | 5 | Poor | — | — |
| Comparative example 3 | 1,3-Dithiane (10) | b-1 (90) | c-1 (1) | f-1 (1) |  | Good | Very good | 1.69 |
| Comparative example 4 | d-3 (30) | b-1 (70) | c-1 (1) | f-1 (1) |  | Good | Very good | 1.69 | b-1: Bis(β-epithiopropyl)sulfide
c-1: 5-(3-Methoxybenzyl)-1,5-diazabicyclo[4,3,0]nonane
d-3: 2,5-Dimercaptomethyl-1,4-dithiane
f-1: 4-Benzoyl-4'-methyldiphenylsulfide

1,3-Dithiane

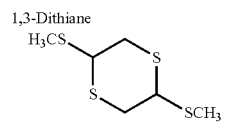

2,5-Dimercaptomethyl-1,4-dithiane

TABLE 5

|  | Cyclic compound (a) (parts by mass) | Episulfide compound (b) (parts by mass) | Photopolymerization initiator (c) (parts by mass) | Thiol compound (d) (parts by mass) | Acidic compound (e) (parts by mass) | Photosensitizer (f) (parts by mass) | Substrate | Appearance |
|---|---|---|---|---|---|---|---|---|
| Comparative example 5 |  | b-1 (100) | c-1 (1) |  |  | f-1 (1) | LASFN7 | Poor |
| Comparative example 6 |  | b-1 (100) | c-1 (1) |  |  | f-1 (1) | Sapphire | Poor | b-1: Bis(β-epithiopropyl)sulfide
c-1: 5-(3-Methoxybenzyl)-1,5-diazabicyclo[4,3,0]nonane
f-1: 4-Benzoyl-4'-methyldiphenylsulfide

The invention claimed is:

1. A photocurable composition comprising a cyclic compound (a) represented by Formula (1), an episulfide compound (b), a photopolymerization initiator (c), and a sensitizer (f):

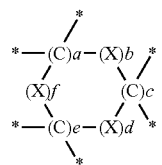

wherein, C represents a carbon atom, X represents S, Se or Te, a to f each represent an integer of 0-3 provided that $8 \geq (a+c+e) \geq 1$, $8 \geq (b+d+f) \geq 2$ and $(b+d+f) \geq (a+c+e)$, and * represents a bonding site, wherein the cyclic compound (a) comprises 1,2,4,5-tetrathiane or 1,2,3,5,6-pentathiepane,
wherein the photopolymerization initiator (c) is a photobase generator,
wherein an amount of the sensitizer (f) is 0.05-3 parts by mass relative to 100 parts by mass of the sum of the cyclic compound (a) and the episulfide compound (b).

2. The photocurable composition according to claim 1, wherein the proportion of the cyclic compound (a) in the photocurable composition is 5-80 mass %, the proportion of the episulfide compound (b) is 20-95 mass %, the proportion of the photopolymerization initiator (c) is in a range of 0.1-10 parts by mass to 100 parts by mass of the sum of the cyclic compound (a) and the episulfide compound (b).

3. The photocurable composition according to claim 1 comprising 0.1-20 parts by mass of a thiol compound (d) to 100 parts by mass of the sum of the cyclic compound (a) and the episulfide compound (b).

4. The photocurable composition according to claim 1 comprising 0.001-1 parts by mass of an acidic compound (e)

to 100 parts by mass of the sum of the cyclic compound (a) and the episulfide compound (b).

5. The photocurable composition according to claim 1, wherein a refractive index as measured by a sodium D-line after curing the photocurable composition is 1.73 or higher.

6. The photocurable composition according to claim 1, wherein the episulfide compound (b) has a structure represented by Formula (2):

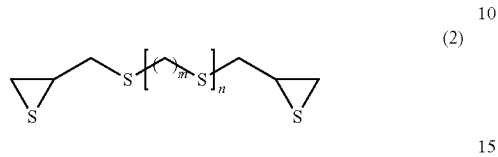

wherein, m represents an integer of 0-4 and n represents an integer of 0-2.

7. The photocurable composition according to claim 1, which does not contain elemental sulfur.

8. A resin obtained by curing the photocurable composition according to claim 1.

9. An optical material comprising the resin according to claim 8.

10. The photocurable composition according to claim 1, wherein the photopolymerization initiator (c) is 5-(3-methoxybenzyl)-1,5-diazabicyclo[4,3,0]nonane or tetrabutylammonium butyltri(1-naphtyl)borate.

11. The photocurable composition according to claim 3, wherein the thiol compound (d) is bis(2-mercaptoethyl) sulfide or pentaerythritol tetrakisthiopropionate.

* * * * *